J. P. BACHMAN.
DOUGH MIXING MACHINE.
APPLICATION FILED JAN. 28, 1918.

1,290,045.

Patented Jan. 7, 1919.
4 SHEETS—SHEET 1.

Inventor
Joseph P. Bachman
By his Attorney

J. P. BACHMAN.
DOUGH MIXING MACHINE.
APPLICATION FILED JAN. 28, 1918.

1,290,045.

Patented Jan. 7, 1919.
4 SHEETS—SHEET 2

Inventor
Joseph P. Bachman
By his Attorney

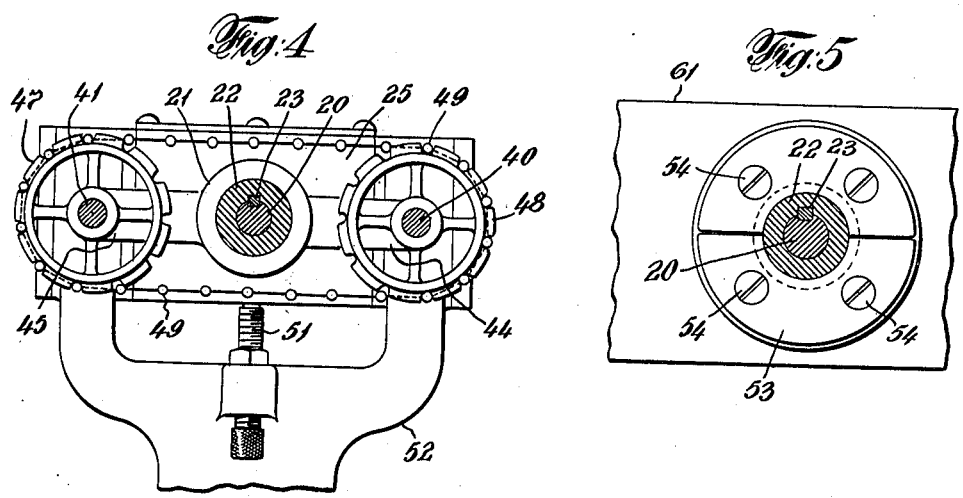
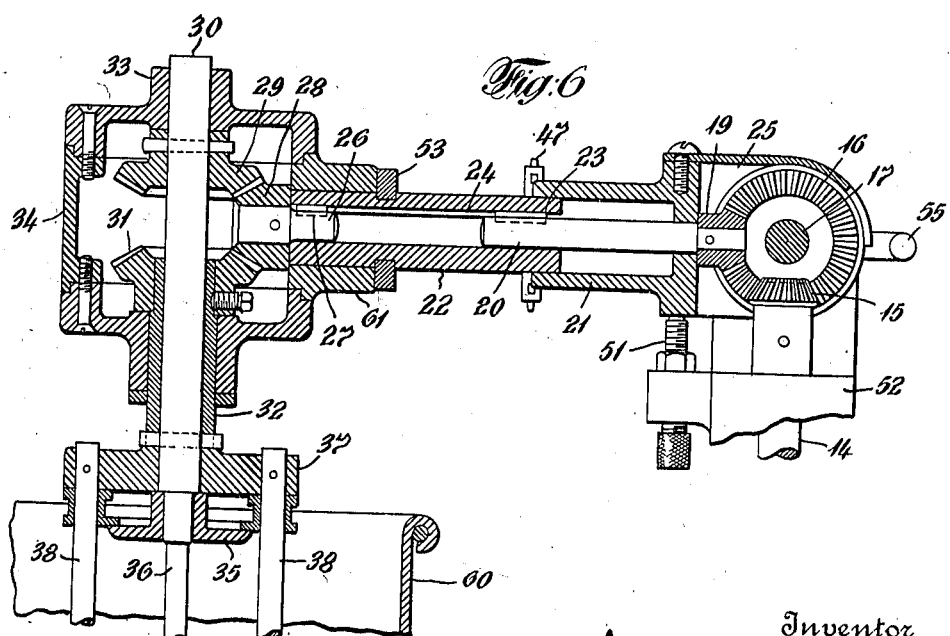

J. P. BACHMAN.
DOUGH MIXING MACHINE.
APPLICATION FILED JAN. 28, 1918.

1,290,045.

Patented Jan. 7, 1919.
4 SHEETS—SHEET 4.

Inventor
Joseph P. Bachman
By his Attorney

UNITED STATES PATENT OFFICE.

JOSEPH P. BACHMAN, OF NEWARK, NEW JERSEY.

DOUGH-MIXING MACHINE.

1,290,045.   Specification of Letters Patent.   Patented Jan. 7, 1919.

Application filed January 28, 1918. Serial No. 214,066.

*To all whom it may concern:*

Be it known that I, JOSEPH P. BACHMAN, a citizen of the United States, and a resident of Newark, in the county of Essex and State of New Jersey, have invented certain new and useful Improvements in Dough-Mixing Machines, of which the following is a full, clear, and exact specification.

My invention relates to dough mixing machines and refers particularly to machines suitable for the mixing of varying quantities of dough.

One object of my invention is a dough mixing device whereby the cutting, breaking or tearing of varying amounts of dough during the mixing may be prevented.

Another object of my invention is a device in which the various operations of dough producing and mixing may be performed hygienically and economically.

Another object of my invention is a device in which the dough will not stick or adhere to the mixing or stirring means and will not pack between the stirring means and the dough receptacle.

Another object of my invention is a device in which varying quantities of dough may be thoroughly intermingled without breaking or cutting the dough.

Another object of my invention is a device in which the position of the stirring apparatus within the dough pan may be changed to intermingle varying quantities of dough.

Another object of my invention is a device in which the position of the stirring apparatus within the dough pan may be changed during the operation of the device.

These and other objects of my invention will be evident upon a consideration of my specification and claims.

The most important operation in the formation of bread and similar doughs is the proper development of the glutinous ingredients. It is by means of these glutens that the gases are properly retained in the bread, which retention under proper conditions is absolutely essential for the formation of a superior product. It has been found that these glutinous materials are highly developed when the dough is stretched and pulled continuously and is not cut or broken. By this pulling process the glutinous ingredients obtain a high degree of a stretching property and hence when the gases are formed within the bread this glutinous material stretches to a greater degree and allows a greater expansion of the dough due to the gas formation. If these glutinous materials do not possess this stretching property, they break before the gases have been properly developed, allowing the escape of the gases and materially decreasing the value of the product. On the other hand, if these glutinous materials are of a hard consistency, the force of the developed gases is not sufficient to expand them and the dough does not rise properly. It is therefore evident that the formation of these glutinous materials into a pliable and stretchable condition is of the highest importance and every effort must be expended to form these glutinous materials by pulling or stretching processes and to prevent, if possible, all cutting or breaking processes. The dough mixing machines generally employed, break or cut the dough into pieces during the mixing operation, thus preventing the proper formation of the glutinous materials, whereas the device of this invention does not cut or break the dough but subjects it to a continuous and regular pulling or stretching operation developing the glutinous materials into the highest state of efficiency.

I have found that during this revolution of the stirring rods within the dough, that proper mixing of the dough is dependent upon the degree of passage and retardation of the dough between the stirring rods and the side of the revoluble receptacle. The amount of dough being worked must have a certain relation to the space between the rods and the receptacle. If this space is too large, the dough will not be retarded by the revolving receptacle but will have a tendency to wind itself around the stirring rods and hence the proper working of the dough will not be accomplished. On the other hand if this space is too small the dough will back up and accumulate between the side of the revoluble receptacle and the stirring rods, causing the dough to creep over the side of the receptacle, producing undue strain upon the mechanism and tearing and breaking the dough mass during its manipulation.

It is evident therefore that if the stirring rods are fixedly spaced from the side of the revoluble receptacle, the working capacity of the device is also limited to such an amount of dough as will allow proper passage and retardation of the dough between these members.

One machine of this character is therefore incapable of properly working varying quantities of dough and a number of machines is necessary where dough masses of different sizes are to be worked, resulting in an undue expenditure of money and occupancy of a considerable floor space not in continual use.

The device of my invention overcomes all of these difficulties and presents a means whereby dough of varying quantities may be properly and effectively worked within the one device by inexpensive, simple and effective means.

The device of my invention, in a broad way, comprises a revoluble dough receptacle within which is a stirring means, said means being capable of being fixed at varying distances from the side of the receptacle thus varying the effective capacity of the devices.

In the accompanying drawings, illustrating modifications of my devices, similar parts are designated by similar numerals.

Fig. 4 is a broken cross-section through the line 4—4 of Fig. 3.

Fig. 5 is a broken cross-section through the line 5—5 of Fig. 3.

Fig. 6 is a broken enlarged vertical cross-section of the stirring and moving mechanism of the stirrers.

Figure 1:
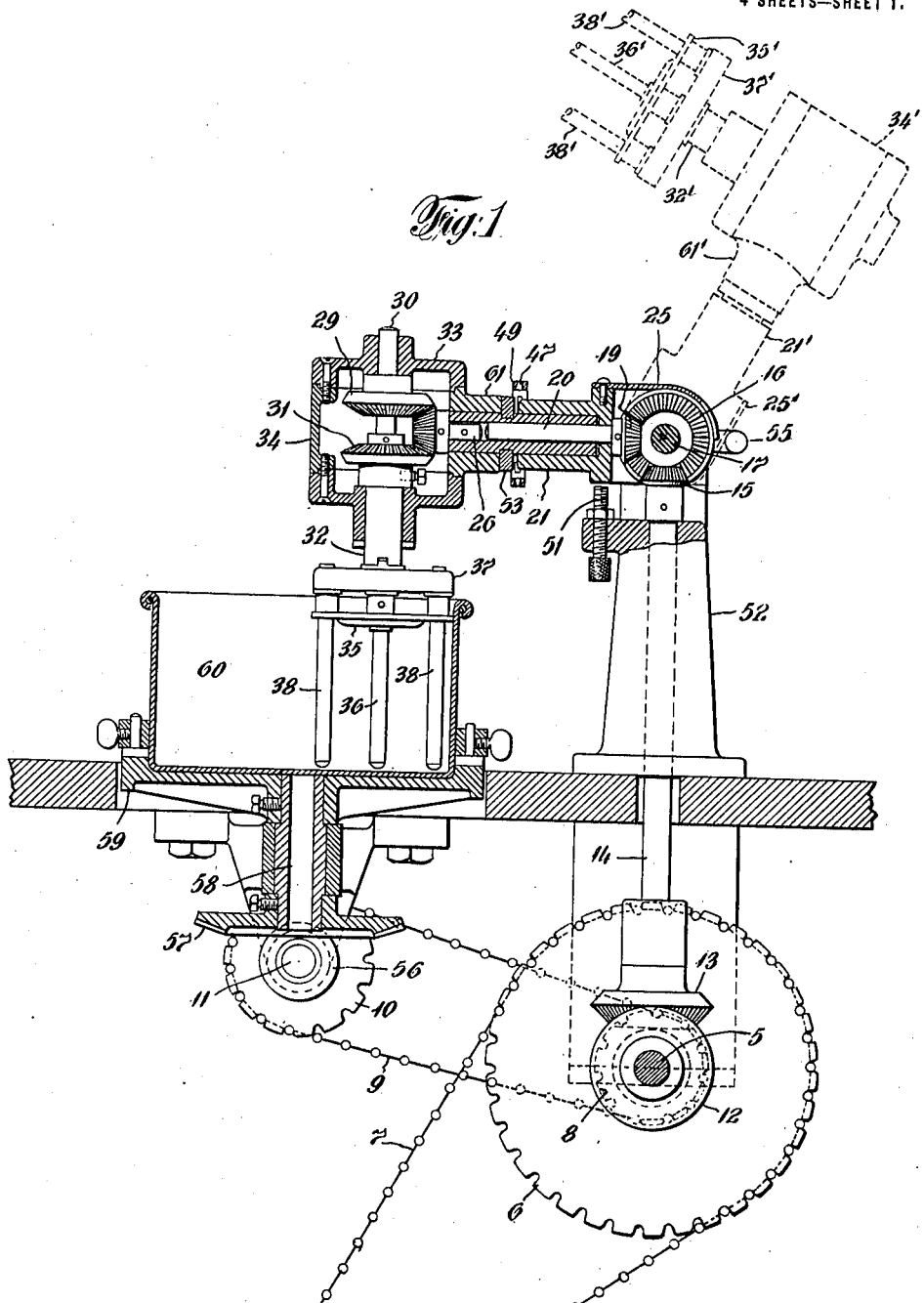
Figure 1 is a cross-section through the line 1—1 of Fig. 2 with the complete removal of the stirring mechanism from the dough receptacle shown in dotted lines.
Figure 2:
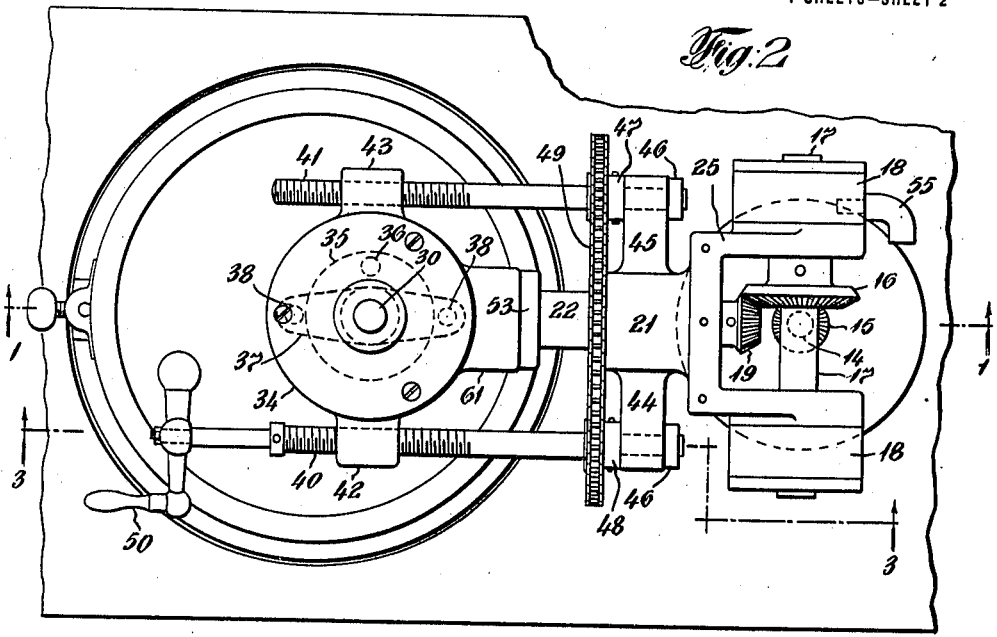
Fig. 2 is a top plan view of Fig. 1.
Figure 3:
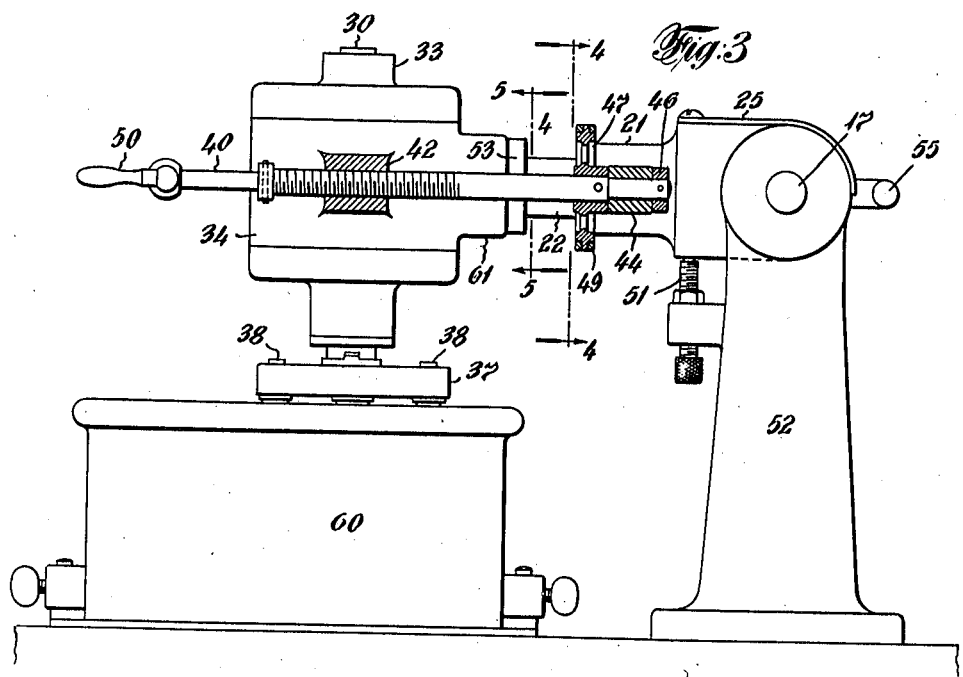
Fig. 3 is a side plan view of Fig. 2, partly in cross-section.

The shaft 5 carries the sprocket wheel 6, connected to a source of power, not shown, by means of the chain belt 7. The shaft 5 also carries the sprocket wheel 8 connected by means of the chain belt 9 to the sprocket wheel 10 carried by the shaft 11. The shaft 5 also carries the spur wheel 12 meshing with the spur wheel 13 carried by the revoluble shaft 14. The upper portion of the shaft 14 carries the spur wheel 15, meshing with the spur wheel 16, carried by the revoluble shaft 17, revoluble within bearings within the members 18, 18. The spur wheel 16 meshes with the spur wheel 19 carried by the revoluble shaft 20 revoluble within the annular bearings 21 and 22. The shaft 20 carries a spline 23 movable within the longitudinal recess 24 of the bearing sleeve 22. The bearing 22 is slidably movable and revoluble within the bearing 21 which is integral with the extended branched member 25, which in turn is revoluble upon the shaft 17. Within the bearing 22 is the slidable shaft 26, having a spline 27 movable within the longitudinal recess 24 of the bearing 22. The shaft 26 carries the bevel gear 28, which meshes with the bevel gear 29 of the shaft 30 and with the bevel gear 31 of the sleeve 32 revoluble around the shaft 30. The shaft 30 is revoluble within the upper bearing 33 of the top member of the casement 34 and the revoluble sleeve 32, and carries a circular member 35 from which there extends a stirring rod 36. The revoluble sleeve 32 is fixedly attached to the arm 37 carrying the stirring rods 38, 38. Two threaded rods 40 and 41 are threaded within openings passing through the two extended arms 42 and 43 integral with the casement 34, and extend through openings within the two extended arms 44 and 45 integral with the member 21 and carry the nut locks 46, 46, 46. The sprocket wheel 47 is fixedly attached to the rod 40, and the sprocket wheel 48 is fixedly attached to the rod 41, revolution being imparted to the wheel 48 by means of the chain belt 49. A handle 50 is fixedly attached to the rod 40 to facilitate the revolution thereof. A screw bolt 51, carried by the frame 52, regulated the lowest downward position of the stirrers and attached mechanism. The annular member 53 is fixedly attached to the member 61 of the casement 34 by the screws 54, 54 and is extended into an annular groove within the member 22, allowing the member 22 to revolve, the member 53 preventing longitudinal movement of the two members 61 and 22. A pin 55 attached to the member 18 limits the backward movement of the stirring mechanism, as shown in Fig. 1. The shaft 11 carries the bevel gear 56 which meshes with the bevel gear 57 carried by the shaft 58, the upper end of which carries the revoluble table 59 upon which is placed the dough receptacle 60.

The operation of the device is as follows:—

Power is imparted to the spur wheel 6, thus revolving the shaft 14 and the shaft 20 through the medium of the intermediary spur wheels. The shaft 20 causes the sleeve member 22 to revolve, which in turn causes the shaft 26 to revolve, and the latter through the gears, as explained, causes the stirrers 38, 38 to revolve in one direction and the stirrer 36 to revolve in a circle in the opposite direction. At the same time the dough receptacle 60 is revolved in a direction opposite to that of the stirrers 38, 38. If now the handle 50 be turned, the rod 40 will revolve through the casing members 42, the sprocket 47 will revolve, the motion will be imparted to the sprocket 48, which, in turn, will revolve the rod 41, thus causing the rods 40 and 41 to move equally laterally, moving the casement 34 with its attached stirring rods along the diameter of the dough receptacle 60. It is evident that this movement of the stirrers can be made either while the device is stirring or while it is at rest, and that it produces varying distances between the stirring rods 38, 38 and the side of the dough receptacle.

Figure 7:
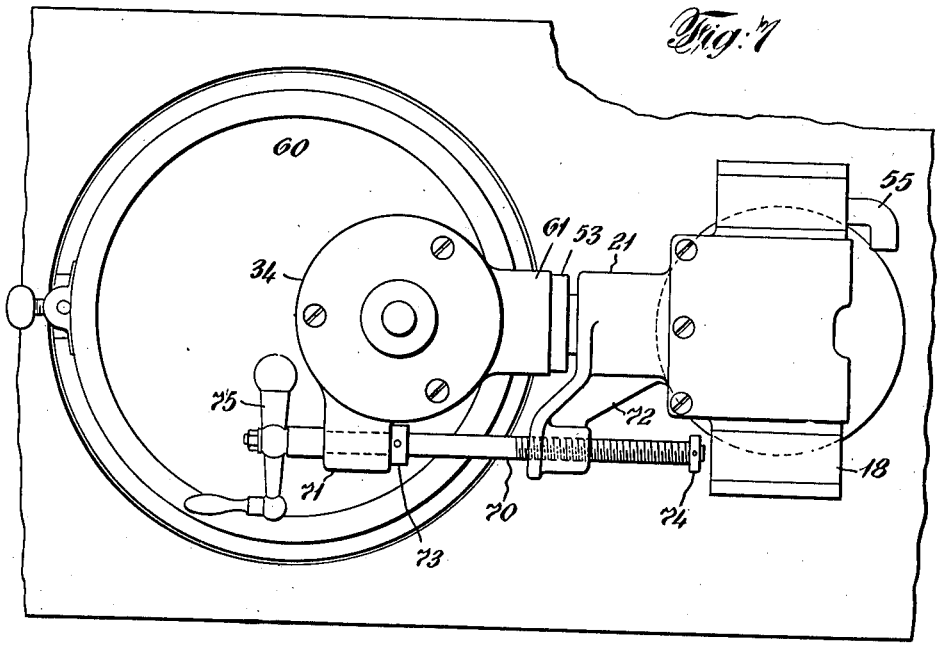
Fig. 7 is a top plan view of a modification of my device.

In the modification shown in Fig. 7, a rod 70 passes through a hole within the supporting arm 71, integral with the casement 34, the threaded portion of the rod 70 meshing with a threaded hole within the arm 72 integral with the member 21. A follow-up collar 73 is fixedly attached to the rod 70, and a collar 74 is fixedly attached to the rod 70. A handle 75 is fixed to the rod 70. In this modification of the means for moving the stirring mechanism, the handle 75 is revolved, causing a movement of the rod 70 due to its threaded portion within the arm 72, thus causing a movement of the stirring mechanism.

Figure 8:
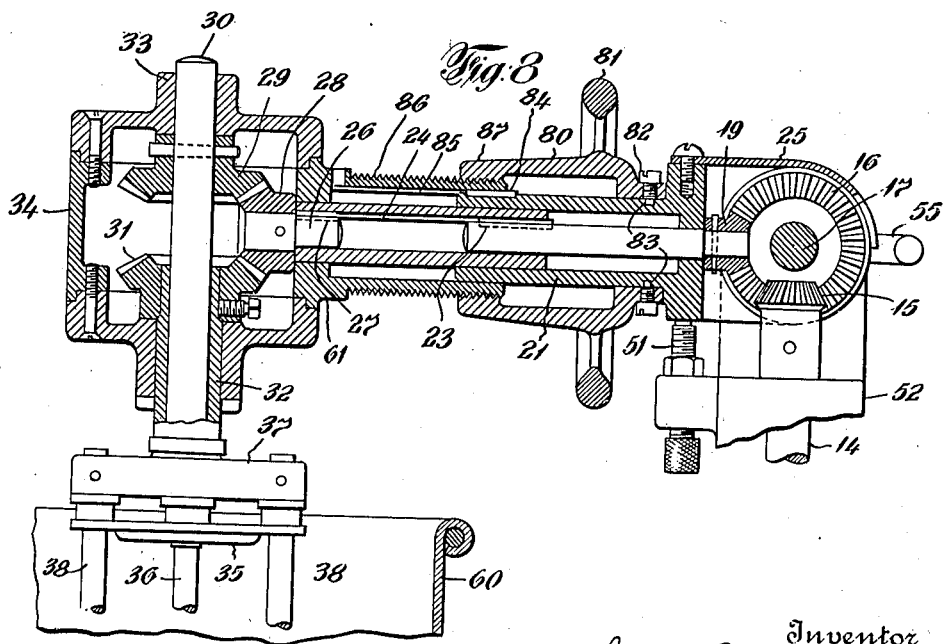
Fig. 8 is a broken vertical cross-section of a modification of my device.

In the modification shown in Fig. 8, a sleeve 80, carrying the integral wheel 81, is revoluble around the member 21, a set screw 82, revoluble within an annular groove 83 allowing the revolution and preventing a longitudinal movement of the sleeve 80. The member 21 carries a spline 84 slidable within a longitudinal recess 85 of the sleeve 86. The sleeve 86 is integral with the member 61 of the casement 34, and has an exterior thread meshable with an interior thread in the portion 87 of the member 80. In this modification of the moving mechanism of the stirrers, the wheel 81 is revolved which revolves the sleeve 80, the thread of which causes a movement of the sleeve 86 and the attached casement and stirrers.

The effectiveness of the device is shown by a consideration of Figs. 1 and 6. When the stirrers 38, 38, 36 are in the position shown in Fig. 6, the amount of dough which can be worked within the receptacle 60 is governed by the space between the revolving rods 38, 38 and the side of the receptacle 60, and the same is true of the position shown in Fig. 6.

It is evident that an amount of dough introduced into the receptacle 60 of Fig. 1, which would choke up between the rods 38, 38 and the side of 60, clogging the revolution of the rods 38, 38 and causing improper mixture would not be sufficiently great to cause the same undesirable results if introduced into the receptacle 60 of Fig. 6, as in this case the space between the rods 38, 38 and the side of 60 is sufficiently great to allow the passage of the dough therethrough resulting in proper mixing.

On the other hand, it is equally evident that if the amount of dough which can be properly worked in Fig. 1 be introduced into Fig. 6, it might not be great enough to fill the receptacle of Fig. 6 sufficiently to allow of perfect working on account of the greater distance between the rods 38, 38 and the side of 60.

Practical experience has shown that the effective and efficient working capacity of a device can be more than doubled by the use of my device. If the position of the stirrers as shown in Fig. 1 will allow of a capacity working of 150 lbs. of dough, its capacity working may be increased to 400 lbs. of dough by positioning the stirrers as shown in Fig. 6. This is a most valuable improvement over present known devices, in which the position of the stirrers is fixed, as it allows the use of one device for the proper working of varying quantities of dough, which is very frequently demanded in the practical use of dough mixers.

While I have described my invention in combination with a particular form of stirring means, comprising stirring rods revolving in concentric circles with respect to each other within a revoluble dough receptacle, it is evident that it can be used in conjunction with any form of stirring means within the dough receptacle.

I do not limit myself to the particular size, shape, number or arrangement of parts as described and shown, all of which may be varied without going beyond the scope of my invention as described and claimed.

What I claim is:—

1. In a dough mixing machine, in combination, a revoluble receptacle, means for revolving the receptacle, stirring means within the receptacle, and means for moving the stirring means transversely of the receptacle during the revolution of the receptacle and the revolution of the stirring means, the stirring means being capable of being fixed at a predetermined distance from the side of the receptacle.

2. In a dough mixing machine, in combination, a revoluble receptacle, means for revolving the receptacle, a casement, stirring means carried by the casement, and means for moving the casement transversely of the receptacle during the revolution of the receptacle and the revolution of the stirring means, the stirring means being capable of being fixed at a predetermined distance from the side of the receptacle.

3. In a dough mixing machine, in combination, a receptacle, a series of stirring rods within the receptacle revoluble in opposite directions with respect to each other, means for revolving the stirring rods and means for moving the stirring rods transversely of the receptacle varying the distance between the stirring rods and the sides of the receptacle.

4. In a dough mixing machine, in combination, a revoluble receptacle, means for revolving the receptacle, a series of stirring rods within the receptacle revoluble in opposite directions with respect to each other, means for revolving the stirring rods, and means for moving the stirring rods to varying distances from the side of the receptacle during the revolution of the receptacle and the revolution of the stirring rods.

5. In a dough mixing machine, in combination, a receptacle, a revoluble shaft, means for revolving the shaft, a sleeve slidable over the revoluble shaft and revoluble therewith, a second revoluble shaft within the sleeve and revoluble therewith, means whereby the revolution of the second shaft will revolve a stirring means, stirring means, means whereby the sleeve and the second shaft may be slidably moved with respect to the first shaft varying the distance between the stirring means and the side of the receptacle.

6. In a dough mixing machine, in combination, a revoluble receptacle, means for revolving the receptacle, a revoluble shaft, means for revolving the shaft, a sleeve slidable over the revoluble shaft and revoluble therewith, a second revoluble shaft within the sleeve and revoluble therewith, means whereby the revolution of the second shaft will revolve a stirring means, stirring means, means whereby the sleeve and the second shaft may be slidably moved with respect to the first shaft varying the distance between the stirring means and the side of the receptacle during the revolution of the receptacle and the stirring means.

7. In a dough mixing machine, in combination, a revoluble receptacle, means for revolving the receptacle, a casement, a vertical revoluble shaft carried by the casement, means for revolving the shaft, revoluble stirring means carried by the end of the shaft within the receptacle and means for moving the casement, the shaft and the stirring means transversely of the receptacle positioning the stirring means at varying distances from the side of the receptacle during the revolution of the stirring means.

8. In a dough mixing machine, in combination, a receptacle, a revoluble shaft, means for revolving the shaft, a sleeve slidable over the revoluble shaft and revoluble therewith, a second revoluble shaft within the sleeve and revoluble therewith, a vertically inclined revoluble shaft revoluble with the second shaft, stirring means carried by the end of the vertical shaft within the receptacle and means whereby the sleeve and the second shaft may be slidably moved with respect to the first shaft varying the distance between the stirring means and the side of the receptacle.

9. In a dough mixing machine, in combination, a receptacle, a revoluble shaft, means for revolving the shaft, a sleeve slidable over the revoluble shaft and revoluble therewith, a second revoluble shaft within the sleeve and revoluble therewith, a vertically inclined revoluble shaft revoluble with the second shaft, stirring means carried by the end of the vertical shaft within the receptacle and means whereby the sleeve and the second shaft may be slidably moved with respect to the first shaft varying the distance between the stirring means and the side of the receptacle during the revolution of the receptacle and the stirring means.

JOSEPH P. BACHMAN.